(12) United States Patent
Iwamoto et al.

(10) Patent No.: US 8,179,509 B2
(45) Date of Patent: May 15, 2012

(54) LIQUID CRYSTAL DISPLAY DEVICE AND ITS MANUFACTURE METHOD

(75) Inventors: Yoshihisa Iwamoto, Yokohama (JP); Hajime Shimizu, Iida (JP)

(73) Assignee: Stanley Electric Co., Ltd., Tokyo (JP)

( * ) Notice: Subject to any disclaimer, the term of this patent is extended or adjusted under 35 U.S.C. 154(b) by 1152 days.

(21) Appl. No.: 12/006,733

(22) Filed: Jan. 4, 2008

(65) Prior Publication Data
US 2008/0180620 A1 Jul. 31, 2008

(30) Foreign Application Priority Data
Jan. 25, 2007 (JP) ................... 2007-014580

(51) Int. Cl.
*G02F 1/1337* (2006.01)
(52) U.S. Cl. ......................... 349/124; 349/126
(58) Field of Classification Search ............... None
See application file for complete search history.

(56) References Cited

U.S. PATENT DOCUMENTS

| 5,946,064 A * | 8/1999 | Lee .................. 349/124 |
| 6,040,885 A | 3/2000 | Koike et al. |
| 2004/0066480 A1 * | 4/2004 | Yoshida et al. .............. 349/123 |

FOREIGN PATENT DOCUMENTS

| JP | 07-318879 A | 12/1995 |
| JP | 10-096929 A | 4/1998 |
| JP | 2000-292792 A | 10/2000 |
| JP | 2001-708978 A | 4/2001 |
| JP | 2005-234254 A | 9/2005 |

OTHER PUBLICATIONS

Related U.S. Appl. No. 12/006,734, filed Jan. 4, 2008; Inventors: Yoshihisa Iwamoto et al Title: Liquid Crystal Display Device.
Japanese Office Action dated Dec. 20, 2011 (and English translation of the relevant parts thereof) in counterpart Japanese Application No. 2007-014580.

* cited by examiner

*Primary Examiner* — Thanh-Nhan P. Nguyen
(74) *Attorney, Agent, or Firm* — Holtz, Holtz, Goodman & Chick, PC (57) ABSTRACT

A liquid crystal display device using a low duty ratio driving method with a duty ratio not smaller than $1/16$ is manufactured in the following manner. A first substrate is prepared having a first electrode of a predetermined shape. A second substrate is prepared having a second electrode of a shape different from said predetermined shape, the second electrode having signal line electrodes smaller in number than those of the first electrode. An insulating film having necessary insulation is formed on each of the first and second electrodes. First and second vertical alignment films are formed above the first and second substrates, respectively, the first and second vertical alignment films covering the first and second electrodes, respectively. A rubbing process is executed only for the second vertical alignment film. The first and second substrates are disposed facing each other, and liquid crystal having a negative dielectric constant anisotropy is disposed between the first and second substrates. It is possible to prevent alignment defects to be caused by static electricity generated by rubbing of a liquid crystal display device.

14 Claims, 7 Drawing Sheets

| SAMPLE GROUP | ALIGNMENT FILM MATERIAL | ALIGNMENT HOLE FORMATION RATE |
|---|---|---|
| SG-A | PI-A | 75% |
| SG-B | PI-B | 30% |
| SG-C | PI-C | 12% |
| SG-D | PI-D | 1% |

(3B)

| RUBBING CONDITION | ALIGNMENT HOLE FORMATION RATE |
|---|---|
| RUBBING FOR BOTH UPPER AND LOWER SUBSTRATES | 75%, 92% |
| ONLY FOR SEGMENT SUBSTRATE | 88% |
| ONLY FOR COMMON SUBSTRATE | 0% |
| NO RUBBING | 0% |

(3C)

| SAMPLE GROUP | ALIGNMENT FILM MATERIAL | CHARGE RESIDENT TIME |
|---|---|---|
| SG-A | PI-A | 2320sec |
| SG-B | PI-B | 520sec |
| SG-C | PI-C | 350sec |
| SG-D | PI-D | 410sec |

LIQUID CRYSTAL DISPLAY DEVICE AND ITS MANUFACTURE METHOD

CROSS REFERENCE TO RELATED APPLICATION

This application is based on and claims priority of Japanese Patent Application No. 2007-014580 filed on Jan. 25, 2007, the entire contents of which are incorporated herein by reference.

BACKGROUND OF THE INVENTION

A) Field of the Invention

The present invention relates to a liquid crystal display device and its manufacture method, and more particularly to a vertical alignment type liquid crystal display device and its manufacture method.

B) Description of the Related Art

Alignment directions of liquid crystal molecules of a liquid crystal display device (particularly a vertical alignment type liquid crystal display device) are controlled by a rubbing process for alignment films to improve the image quality. The present inventors and others have proposed in JP-A-2005-234254 a liquid crystal display device having a uniform pretilt angle and no rubbing flaws after a rubbing process for an organic polymer material thin film such as polyimide formed on the substrates, and its manufacture method.

An alignment film of a liquid crystal display device is charged with static electricity by a rubbing process. As this static electricity is discharged, a liquid crystal alignment function of the alignment film is damaged and an alignment defect is formed. This liquid crystal display device is a defective product having a localized optical hole (in this specification, this localized optical hole is called an alignment hole). The alignment hole forms a white dot in normally black display, and a black dot in normally white display.

JP-A-HEI-7-318879 has proposed a method of preventing alignment defects to be caused by static electricity discharge by externally connecting the electrodes to make them have the same potential.

SUMMARY OF THE INVENTION

It is an object of the present invention to provide a liquid crystal display device capable of eliminating alignment defects to be caused by static electricity generated during a rubbing process, and its manufacture method.

According to one aspect of the present invention, there is provided a manufacture method for a liquid crystal display device using a low duty ratio driving method with a duty ratio not smaller than $\frac{1}{16}$, comprising steps of: preparing a first substrate having a first electrode of a predetermined shape; preparing a second substrate having a second electrode of a shape different from the predetermined shape, the second electrode having signal line electrodes smaller in number than signal line electrodes of the first electrode; forming an insulating film having necessary insulation on each of the first and second electrodes; forming first and second vertical alignment films above the first and second substrates, respectively, the first and second vertical alignment films covering the first and second electrodes, respectively; executing a rubbing process only for the second vertical alignment film; and disposing the first and second substrates facing each other, and disposing liquid crystal having a negative dielectric constant anisotropy between the first and second substrates.

According to another aspect of the present invention, there is provided a liquid crystal display device using a low duty ratio driving method with a duty ratio not smaller than $\frac{1}{16}$, comprising: a first substrate having a first electrode of a predetermined shape; a second substrate having a second electrode of a shape different from the predetermined shape, the second electrode having signal line electrodes smaller in number than signal line electrodes of the first electrode; liquid crystal sandwiched between the first and second substrates; first and second vertical alignment films formed on the first and second substrates on a side of the liquid crystal; and an insulating film having necessary insulation formed between the first electrode and the first vertical alignment film and between the second electrode and the second vertical alignment film, wherein a rubbing process was executed only for the second vertical alignment film.

DESCRIPTION OF THE PREFERRED EMBODIMENTS

Figure 1:
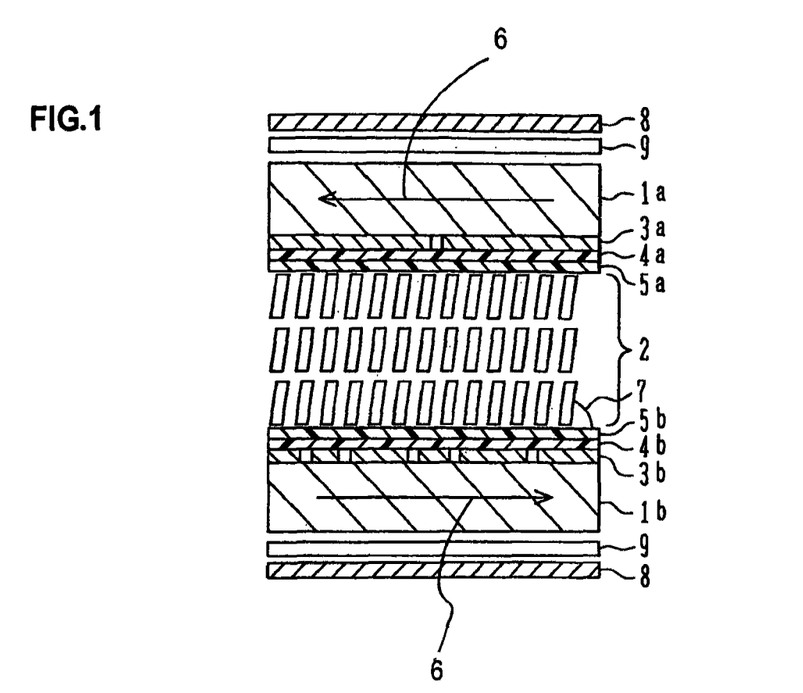
FIG. 1 is a schematic cross sectional view of a liquid crystal display device used for an embodiment and experiments.

FIG. 1 is a schematic cross sectional view of a liquid crystal display device used for an embodiment and experiments. The liquid crystal display device shown has a transparent upper substrate 1a and an opposing transparent lower substrate 1b, and a liquid crystal layer 2. A device outer size is a lateral length of about 160 mm and a vertical length of about 50 mm. A transparent upper electrode 3a is formed as a common electrode on the upper substrate 1a on the liquid crystal layer 2 side. A transparent lower electrode 3b is formed as a segment electrode on the lower substrate 1b. Both the transparent electrodes 3a and 3b are superposed upon each other, sandwiching the liquid crystal layer 2. The superposed area defines a display area. Both the substrates 1a and 1b are provided with alignment films 5a and 5b on the liquid crystal layer 2 side, the alignment films covering both the transparent electrodes. Insulating films 4a and 4b are formed between the alignment films 5a and 5b and the transparent electrodes 3a and 3b, respectively. Polarizing plates 8 are formed above the substrates on the side opposite to the liquid crystal layer 2.

A visual angle compensation plate 9 may be formed between each substrate and polarizing plate, when necessary. The structure without the insulating films 4 and 4b may be used.

The rubbing process described in JP-A-2005-234254 was executed for the alignment films. Rubbing directions are illustratively shown by arrows 6. With the rubbing process, liquid crystal molecules are aligned uniformly at an angle 7 relative to the substrate when voltage is not applied (in this specification, this angle is called a pretilt angle).

The present inventors conducted experiments to check how an alignment hole formation rate changed with vertical alignment film material of four kinds. The materials used in the experiments were polyimide-based vertical alignment films PI-A, PI-B and PI-C manufactured by Chisso Petrochemical Corp. and a polyimide-based vertical alignment film PI-D manufactured by Nissan Chemical Industries, Ltd. Surface free energies of four alignment films calculated from measured contact angles by using pure water and diiode-methane were 35 mN/m to 39 mN/m.

For the experiments, 100 liquid crystal display device samples were formed for each of four alignment film materials. Sample groups are represented by SG-A, SG-B, SG-C and SG-D (an alphabet after SG—corresponds to an alphabet after PI—of the alignment film material).

Each sample was formed by the following sequence. First, indium tin oxide (ITO) was sputtered on the common substrate 1a and segment substrate 1b which were made of, e.g., glass. Thereafter, the ITO layers were patterned to form the common electrode 3a and segment electrode 3b.

After polysilane-based insulating films 4a and 4b were formed on the ITO electrodes 3a and 3b formed on the common substrate 1a and segment substrate 1b, respectively, a pattern of one of four kinds of vertical alignment films was printed by flexographic printing on each insulating film, and baked for 60 minutes at 180° C.

Thereafter, a rubbing process was executed for common and segment sides with a cotton rubbing cloth. The rubbing directions were set as antiparallel alignment when both the substrates are bonded.

Sealing material was printed on one substrate, and a spacer of 4 μm in thickness was formed through spraying on the other substrate. Both the substrates were superposed upon each other and the sealing material was baked while both the substrates were pressed, to form a vacant liquid crystal cell.

The bonded substrate was cut into a liquid crystal cell. Thereafter, liquid crystal material having a negative dielectric constant anisotropy $\Delta\in$ and a specific resistance $\rho_{c1}$ of $1.0\times 10^{14}$ Ωcm was injected by vacuum injection, and the liquid crystal cell was sealed to form a finished liquid crystal cell. A plurality of liquid crystal cells may be formed by cutting a pair of glass substrates.

Thereafter, the liquid crystal cell was heated at a temperature of phase transition to an isotropic phase or higher, and an iodene-based polarizing plate SKN18243T manufactured by Polatechno Co. Ltd. was bonded to the front and back surfaces of the cell. Electrode lead terminals were formed to complete the liquid crystal display device sample.

The pretilt angle 7 of liquid crystal molecules of each sample was 88.0 to 89.5°.

Next, the liquid crystal display device sample groups SG-A, SG-B, SG-C and SG-D using each alignment film were observed, each sample group having 100 samples as described above. It was defined that an alignment hole was formed if even one alignment hole (white dot) is formed in the in-plane (including an area other than the effective display area) of each sample. An alignment hole formation rate of each sample group was checked. If the alignment hole is outside the effective display area, the sample is regarded as a proper product to be shipped.

Figure 2:
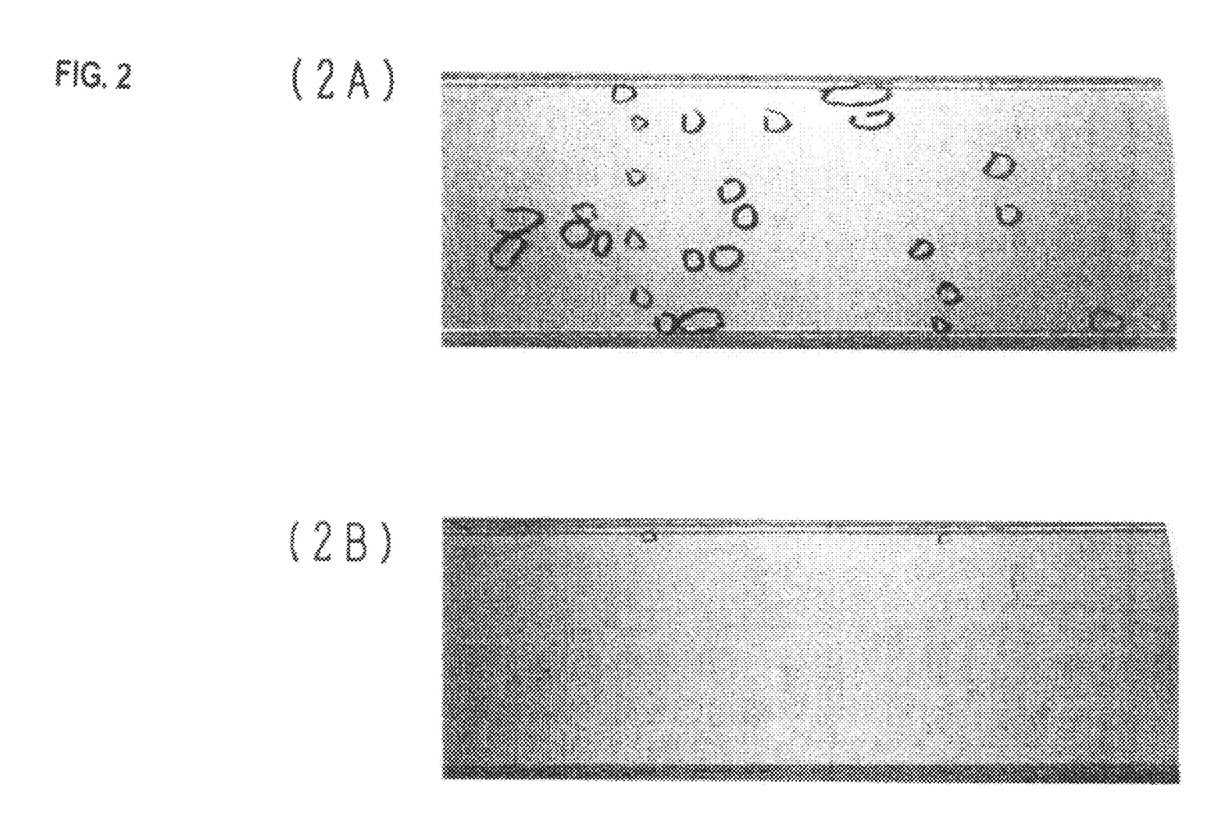
FIGS. 2A and 2B are photographs of a normally black segment display type liquid crystal display device.

FIGS. 2A and 2B are photographs of liquid crystal display device samples in which alignment holes are formed. The photograph of FIG. 2A shows one sample in the sample group SG-A. As shown, alignment holes are formed at positions circled with a black ink pen.

The photograph of FIG. 2B shows one sample in the sample group SG-B. The number of alignment holes is reduced in the sample of the sample group SG-B as compared to the sample of the sample group SG-A. There is a similar tendency also for all samples of the sample groups.

Figure 3:
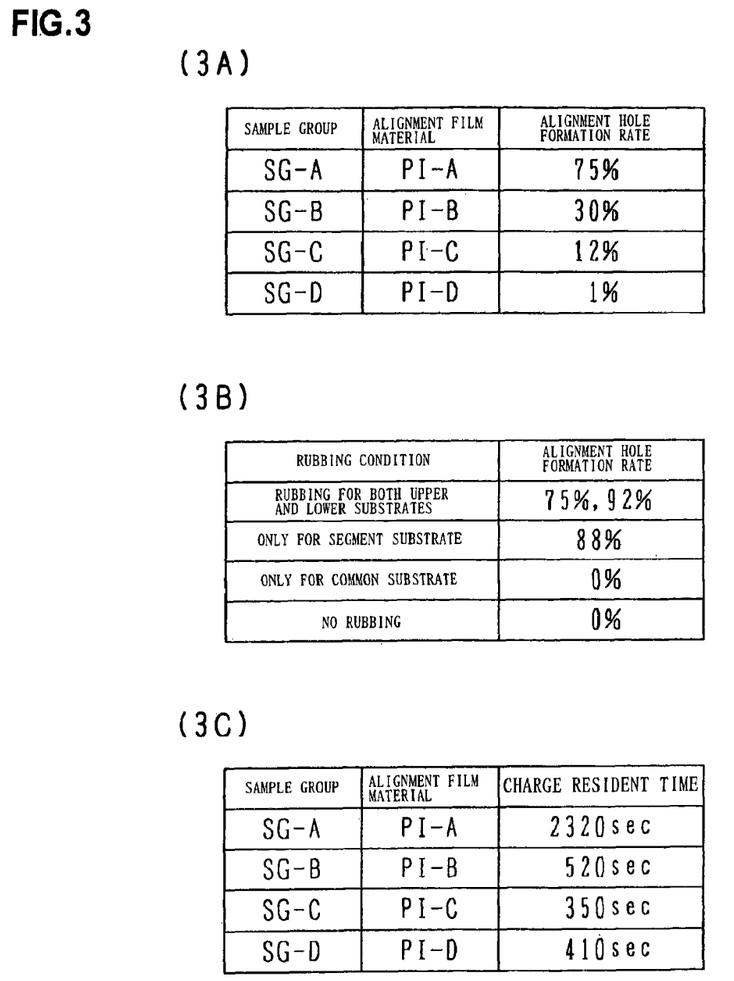
FIG. 3A is a table showing an alignment hole formation rate of each sample group.
FIG. 3B is a table showing an alignment hole formation rate for each rubbing condition.
FIG. 3C is a table showing a charge resident time of each sample group in static electricity experiments.

FIG. 3A is a table showing an alignment hole formation rate of each sample group. It can be seen from this table that there is a large difference of the alignment hole formation rate among the sample groups. The alignment hole formation rate of the sample group SG-A is as high as 75%, and the alignment hole formation rates of the sample groups SG-C and SG-D are as relatively low as 12% and 1%, respectively. Since the other constituent elements are common for all the sample groups, it can be considered that a difference of the alignment hole formation rate results from a difference of the alignment film material. It can be considered from the table that it is effective to use the alignment film materials PI-C and PI-D in order to prevent alignment defects.

Next, the present inventors conducted experiments in how the alignment hole formation rate changed with an alignment film rubbing method, without changing the basic manufacture method for the samples. The alignment film material PI-A was used for the experiments, this was because the present inventors considered that comparing the rubbing methods by using the alignment film material PI-A having a high alignment hole formation rate clarified a difference between the rubbing methods.

FIG. 3B is a table showing experiment results of a relation between the rubbing method and the alignment hole formation rate. As shown in this table, if the upper and lower substrates were subjected to the rubbing process, the alignment hole formation rate was 92%, (The alignment hole formation rate is 75% in the experiment results shown in FIG. 3A. It can be considered that even if the same alignment film material is used, the alignment hole formation rate changes with a manufacture lot. Although there is a difference of about 20%, it can be understood that the sample groups using the same alignment film material PI-A have a high alignment hole formation rate.) An alignment hole formation rate was 88% if only the segment substrate was rubbed. An alignment hole formation rate was 0% if only the common substrate was rubbed or if neither the segment substrate nor the common substrate was rubbed.

The results shown in FIG. 3B suggest that even if the alignment film material PI-A having a high alignment hole formation rate is used, almost all alignment defects can be prevented if only the alignment film formed on the common electrode is subjected to the rubbing process.

Studies are made on the reasons for the measurement results shown in FIG. 3B. In the experiments, the common substrate has electrodes smaller in number than those of the segment substrate, and has a broader area per electrode. Assuming that the charge amount generated by rubbing is constant, a potential is inverse proportional to the electrode area if electric charges are charged uniformly to the electrode. A gap between common electrodes tends to be broader than that between segment electrodes. Since a discharge phenomenon is determined mainly by a potential difference and gap between electrodes, it is considered that discharge occurs more often between common electrodes than between segment electrodes.

From these studies, it can be expected that alignment defects can be prevented by rubbing only the alignment film formed on the substrate having a smaller number of electrodes, either common electrodes or segment electrodes.

It has already been confirmed that rubbing only the alignment film on one substrate does not pose any problem of the liquid crystal display device function of a vertical alignment liquid crystal display device, as described in JP-A-2005-234254.

It can be easily thought that alignment defects can be prevented more easily by using the alignment film materials PI-B, PI-C and PI-D originally hard to form alignment holes.

The inventors conducted then the following experiments to evaluate the characteristics of each alignment film from another viewpoint. Static electricity of 10 kV was applied to five points of each sample, and after the whole effective display portion (segment display portion) was turned on, the time was measured until the displayed image on the sample visually disappears completely by gradual discharge of electric charges. This measurement is equivalent to measuring a charge resident time of the liquid crystal cell. It can be considered that this measurement can evaluate the charge characteristics of the alignment film material, because each liquid crystal display sample group has the same insulating films and liquid crystal material.

The phenomenon that static electricity generated by rubbing discharges between the electrodes of the same substrate to which phenomenon the inventors pay attention, is different from the natural discharge phenomenon of electric charges via liquid crystal in the 10 kV static electricity test described above. The 10 kV static electricity test is known by those skilled in the art as a test for checking the characteristics of a finished liquid crystal display device.

In the static electricity test, the influence of the rubbing process is not required to be considered specifically.

FIG. 3C is a table showing the measurement results of each sample group. As shown, a charge resident time of the sample group SG-A having the alignment hole formation rate of 75% is 2320 seconds. A charge resident time of the sample group SG-B having the alignment hole formation rate of 30% is 520 seconds. The charge resident times of the sample groups SG-C and SG-D having a relatively low alignment hole formation rate are 350 seconds and 410 seconds, respectively. Since the charge resident time relies upon various factors, a relation between the alignment hole formation rate and the charge resident time is not in one-to-one correspondence. However, it can be considered that there is some correlation between the charge resident time and alignment defects. Namely, it can be considered that the sample group having a short charge resident time has a low alignment hole formation rate. If the charge resident time is short, there is a tendency that an average alignment hole formation rate of each sample group becomes small.

It can be considered from the measurement results shown in FIG. 3C that generation of alignment defects can be suppressed by using the alignment film material having the charge resident time not longer than 500 seconds and preferably not longer than 450 seconds in the 10 kV static electricity test, if the liquid crystal material is used having the specific resistance $\rho_{c1}$ of $1\times10^{14}$ Ωcm, and by using the method of manufacturing a liquid crystal display device by performing a rubbing process only for the alignment film formed on the substrate having a smaller number of electrodes.

A factor of determining the charge resident time in the static electricity test includes also a specific resistance of liquid crystal. If the same alignment film material is used, the charge resident time is considered to be approximately proportional to a specific resistance of liquid crystal. Vertical alignment liquid crystal material has generally a specific resistance of $1\times10^{12}$ Ωcm to $1\times10^{15}$ Ωcm. With the method of rubbing only an alignment film formed on the substrate having a smaller number of electrodes, the liquid crystal material having the above-described specific resistance is considered to be realized by a combination of alignment film materials. If liquid crystal material having a specific resistance of $1\times10^{12}$ Ωcm to $1\times10^{14}$ Ωcm is used, the charge resident time is shortened so that the alignment detect prevention effects can be expected.

A method of preventing alignment defects to be caused by discharge by executing a rubbing process only for an alignment film formed on the substrate having a smaller number of substrates, is applicable to segment type, dot matrix type, and segment-dot matrix type liquid crystal display devices using a driving method at a duty ratio of 1/16 or higher.

Examples of an electrode pattern will be described with reference to the accompanying drawings.

(First Electrode Patterns)

Figure 4:
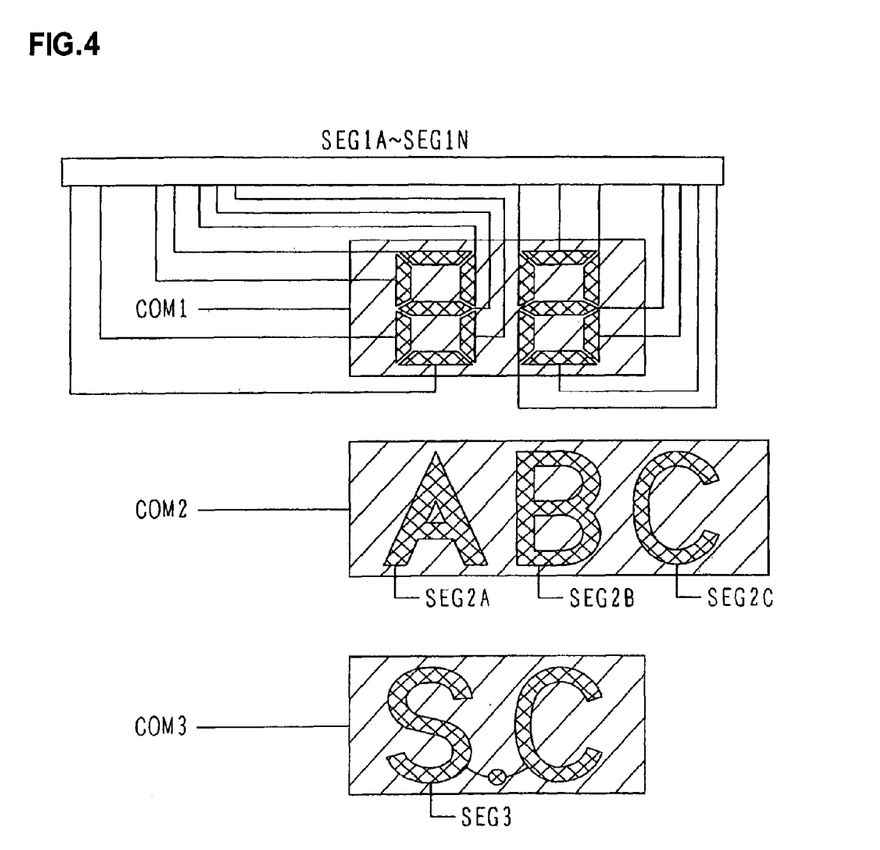
FIG. 4 shows examples of electrode patterns of a segment display type liquid crystal display device using a $\frac{1}{3}$ duty ratio driving method, capable of being applied to the embodiment.

FIG. 4 shows electrode patterns for a segment display type 1/3 duty ratio driving method. FIG. 4 shows schematic plan views of segment electrode patterns and common electrode patterns formed on a pair of opposing substrates as viewed along a substrate normal direction. Electrodes shown by left side lower lines in FIG. 4 are common electrodes formed on a lower substrate, and electrode shown by right side lower lines are segment electrodes ("8", "A", "B", "C" and "S.C"). An area where two electrodes are superposed being indicated by cross hatches defines a display area. Display is controlled by sending 1/3 duty ration common signals COM1, COM2 and COM3 to the common electrodes and segment signals SEG1A to SEG1N, SEG2A to SEG2C, and SEG3 to the segment electrodes.

(Second Electrode Patterns)

Figure 5:
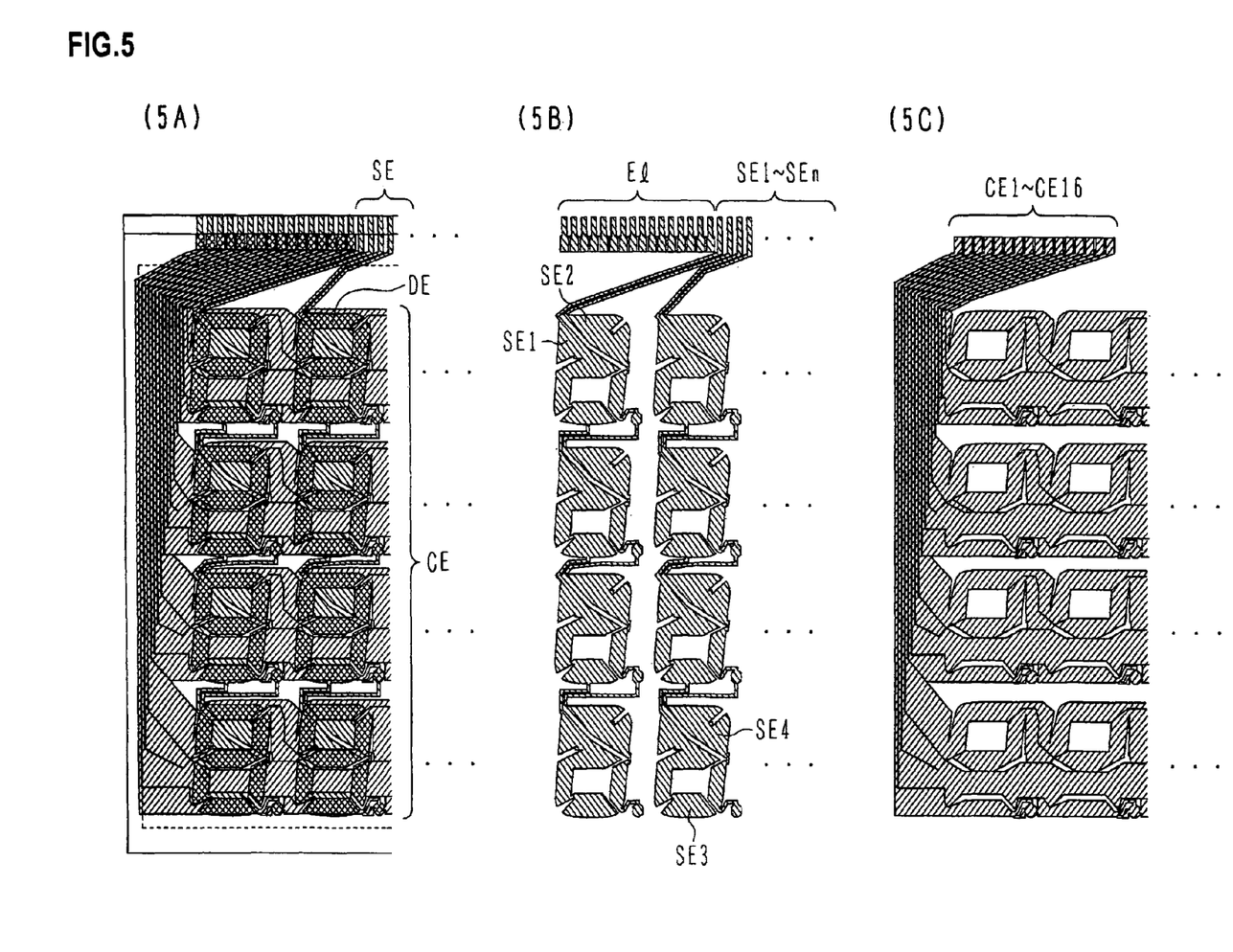
FIGS. 5A to 5C show examples of electrode patterns of a segment display type liquid crystal display device using a $\frac{1}{16}$ duty ratio driving method, capable of being applied to the embodiment.

FIGS. 5A to 5C show electrode patterns for a segment display type 1/16 duty ratio driving method.

As shown in FIG. 5A, segment electrodes SE formed on a segment substrate and common electrodes CE formed on a common substrate define display areas DE displaying numerals "8" and dots ".". The number of common electrodes is sixteen.

FIG. 5B shows a portion of the segment electrodes SE. As shown, two segment electrodes (e.g., SE1 and SE2) are required to form one column of four "8." vertically juxtaposed. Four segment electrodes are used for two columns of "8." shown in FIG. 5B. Columns of segment electrodes are increased laterally by a desired number. Wirings EI at the left of segment electrodes SE1 to SEn are formed on the segment substrate to supply a portion of electric signals to be supplied to the segment substrate side to the common electrodes. The wirings EI are connected to the common electrodes CE through the substrates.

FIG. 5C shows a portion of common electrodes CE1 to CE16. The common electrodes CE can be expanded laterally with the same number of themselves.

Display can be controlled by sending duty ratio 1/16 common signals to the common electrodes CE1 to CE16 and segment signals to the segment electrodes. In the example shown in FIGS. 5A to 5C, since the number of segment electrodes is smaller than that of common electrodes and a gap between electrodes is broader for the segment electrodes than for the common electrodes, a rubbing process is executed for the alignment film formed on the segment substrate.

(Third Electrode Patterns)

Figure 6:
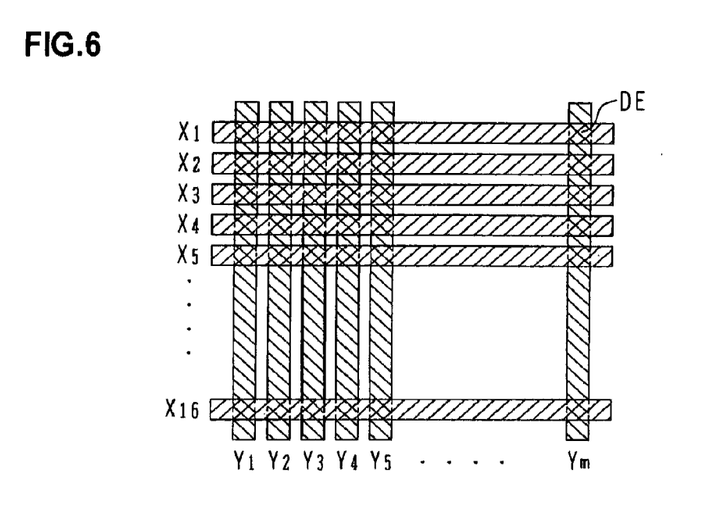
FIG. 6 shows examples of electrode patterns of a dot matrix display type liquid crystal display device using a $\frac{1}{16}$ duty ratio driving method, capable of being applied to the embodiment.
Figure 7:
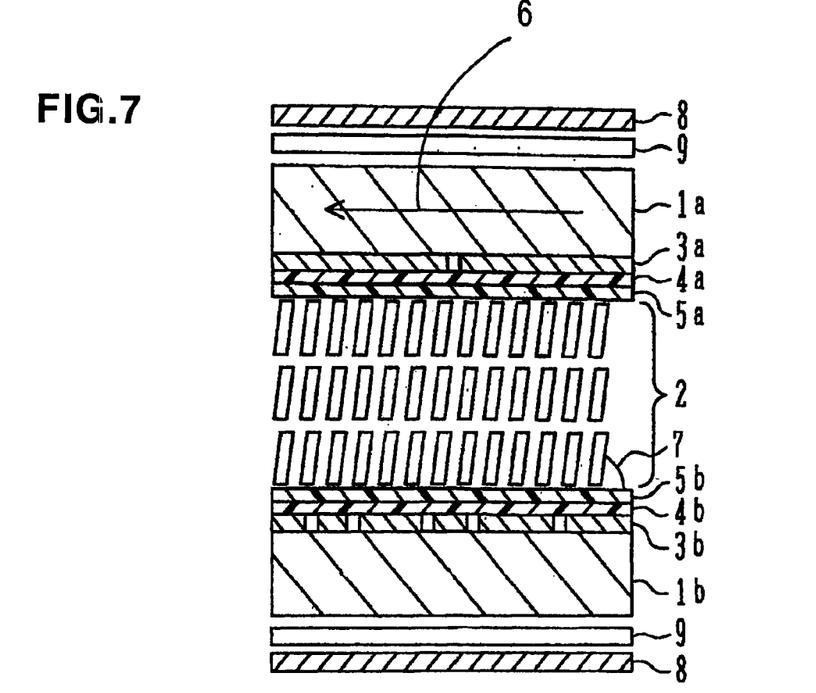
FIG. 7 is a schematic cross sectional view of a liquid crystal display device on which rubbing is performed only for a second vertical alignment film.

FIG. 6 shows an example of an electrode patterns of a dot matrix display type liquid crystal display device using a 1/16 duty ratio driving method. As shown, pixel (display) areas DE are defined by cross areas between sixteen parallel stripe-shaped common electrodes X1 to X16 and an arbitrary number of parallel segment electrodes Y1 to Tm perpendicular to a longitudinal direction of the common electrodes.

Display is controlled by sending duty ration 1/16 common signals to the common electrodes X1 to X16 and segment signals to the segment electrodes.

The number of common electrodes for the 1/16 duty ratio driving method is not necessarily sixteen. In some cases, there are common electrodes larger than sixteen electrodes including an electrode not energized and an electrode energized by a common signal.

The present invention has been described in connection with the preferred embodiments. The invention is not limited only to the above embodiments. For example, the same alignment film material is not necessarily required to be used for both the segment and common substrates, but, for example, PI-A may be used for the segment electrode side alignment film and PI-B may be used for the common electrode side alignment film.

It will be apparent to those skilled in the art that other various modifications, improvements, combinations, and the like can be made.

What are claimed are:

1. A manufacture method for a liquid crystal display device using a low duty ratio driving method with a duty ratio not smaller than 1/16, comprising:
    preparing a first substrate having a first electrode of a predetermined shape;
    preparing a second substrate having a second electrode of a shape different from said predetermined shape, said second electrode having signal line electrodes smaller in number than signal line electrodes of said first electrode;
    forming an insulating film having necessary insulation on each of said first and second electrodes;
    forming first and second vertical alignment films above said first and second substrates, respectively, said first and second vertical alignment films covering said first and second electrodes, respectively;
    executing a rubbing process only for said second vertical alignment film; and
    disposing said first and second substrates facing each other, and disposing liquid crystal having a negative dielectric constant anisotropy between said first and second substrates;
    wherein a specific resistance of said liquid crystal is $1.0 \times 10^{12}$ Ωcm to $1.0 \times 10^{14}$ Ωcm; and
    wherein at least said second vertical alignment film is made of alignment film material satisfying a condition of T≦500 sec, where T is a charge resident time until a display image disappears completely after static electricity of 10 kV is applied between said first and second electrodes and the display image is turned on.

2. The manufacture method for a liquid crystal display device according to claim 1, wherein said charge resident time T satisfies a condition of T≦450 sec.

3. The manufacture method for a liquid crystal display device according to claim 2, wherein a surface free energy of said vertical alignment film is 35 mN/m to 39 mN/m.

4. The manufacture method for a liquid crystal display device according to claim 3, wherein said first and second substrates comprise:
    a common electrode formed in a predetermined area of one of said first and second substrate; and
    a segment electrode formed on the other substrate in a partial area facing said common electrode.

5. The manufacture method for a liquid crystal display device according to claim 4, wherein an angle of liquid crystal molecules of said liquid crystal relative to a substrate surface is 88.0° to 89.5° when no voltage is applied.

6. The manufacture method for a liquid crystal display device according to claim 3, wherein said first and second electrodes are of a dot matrix display type in which said first and second electrodes include common electrodes comprising a plurality of stripe-shaped electrodes and segment electrodes comprising a plurality of stripe-shaped electrodes crossing said plurality of common electrodes, and a cross area between each common electrode and each segment electrode constitutes a pixel area.

7. The manufacture method for a liquid crystal display device according to claim 6, wherein an angle of liquid crystal molecules of said liquid crystal relative to a substrate surface is 88.0° to 89.5° when no voltage is applied.

8. A liquid crystal display device using a low duty ratio driving method with a duty ratio not smaller than 1/16, comprising:
    a first substrate having a first electrode of a predetermined shape;
    a second substrate having a second electrode of a shape different from said predetermined shape, said second electrode having signal line electrodes smaller in number than signal line electrodes of said first electrode;
    liquid crystal sandwiched between said first and second substrates;
    first and second vertical alignment films formed on said first and second substrates on a side of said liquid crystal; and
    an insulating film having necessary insulation formed between said first electrode and said first vertical alignment film and between said second electrode and said second vertical alignment film, wherein a rubbing process was executed only for said second vertical alignment film;
    wherein said liquid crystal has a negative dielectric constant anisotropy Δ∈ and a specific resistance of $1.0 \times 10^{12}$ Ωcm to $1.0 \times 10^{14}$ Ωcm; and
    wherein at least said second vertical alignment film is made of alignment film material satisfying a condition of T≦500 sec, where T is a charge resident time until a display image disappears completely after static electricity of 10 kV is applied between said first and second electrodes and the display image is turned on.

9. The liquid crystal display device according to claim 8, wherein said charge resident time T satisfies a condition of T≦450 sec.

10. The manufacture method for a liquid crystal display device according to claim 9, wherein a surface free energy of said vertical alignment film is 35 mN/m to 39 mN/m.

11. The liquid crystal display device according to claim 10, wherein said first and second substrates comprise:
    a common electrode formed in a predetermined area of one of said first and second substrate; and
    a segment electrode formed on the other substrate in a partial area facing said common electrode.

12. The liquid crystal display device according to claim 11, wherein an angle of liquid crystal molecules of said liquid crystal relative to a substrate surface is 88.0° to 89.5° when no voltage is applied.

13. The liquid crystal display device according to claim 10, wherein said first and second electrodes are of a dot matrix display type in which said first and second electrodes include common electrodes comprising a plurality of stripe-shaped electrodes and segment electrodes comprising a plurality of stripe-shaped electrodes crossing said plurality of common electrodes, and a cross area between each common electrode and each segment electrode constitutes a pixel area.

14. The liquid crystal display device according to claim 13, wherein an angle of liquid crystal molecules of said liquid crystal relative to a substrate surface is 88.0° to 89.5° when no voltage is applied.

* * * * *